(12) United States Patent
Hoffman et al.

(10) Patent No.: US 7,540,207 B2
(45) Date of Patent: Jun. 2, 2009

(54) DEVICE FOR ACTUATING THE DOORS OF VEHICLES

(75) Inventors: Werner Hoffman, Bad Mergentheim (DE); Alexander Eck, Poppenhausen (DE)

(73) Assignee: Wittenstein AG, Igersheim (DE)

( * ) Notice: Subject to any disclaimer, the term of this patent is extended or adjusted under 35 U.S.C. 154(b) by 849 days.

(21) Appl. No.: 10/502,063

(22) PCT Filed: Oct. 15, 2002

(86) PCT No.: PCT/EP02/11521

§ 371 (c)(1),
(2), (4) Date: Feb. 11, 2005

(87) PCT Pub. No.: WO03/062576

PCT Pub. Date: Jul. 31, 2003

(65) Prior Publication Data

US 2005/0235565 A1    Oct. 27, 2005

(51) Int. Cl.
*F16H 21/00* (2006.01)
(52) U.S. Cl. .......................................................... 74/25
(58) Field of Classification Search ..................... 74/25, 74/56, 57; 49/324, 334, 349
See application file for complete search history.

(56) References Cited

U.S. PATENT DOCUMENTS

| 2,579,642 | A | * | 12/1951 | Bachman | 74/22 R |
| 3,080,765 | A | * | 3/1963 | Eisele | 74/57 |
| 3,881,398 | A | * | 5/1975 | Gravagne | 409/281 |
| 5,078,021 | A | * | 1/1992 | Freywiss | 74/490.1 |

* cited by examiner

*Primary Examiner*—Vicky A Johnson
(74) *Attorney, Agent, or Firm*—Bachman & LaPointe, P.C.

(57) ABSTRACT

A device for actuating the doors of vehicles, in particular of an aircraft. The device comprises a drive element, which co-operates with a door lock. A lifting motion of a shaft element and a subsequent rotational motion of a follower element are carried out in an actuation device by a drive element.

12 Claims, 2 Drawing Sheets

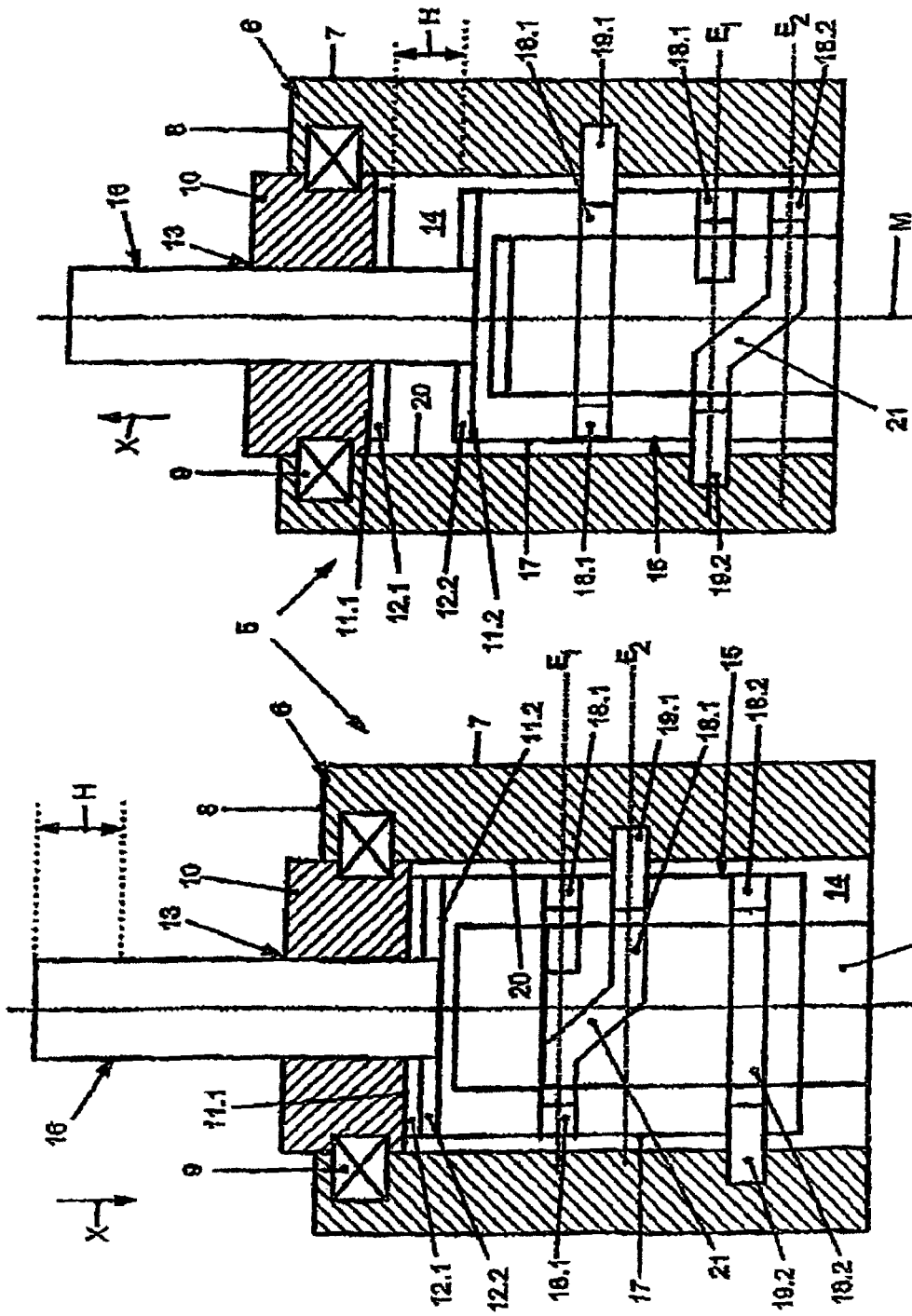

DEVICE FOR ACTUATING THE DOORS OF VEHICLES

BACKGROUND OF THE INVENTION

The present invention relates to a device for actuating doors of vehicles, in particular aircraft, with a drive element which interworks with a door locking mechanism.

Devices of this type for actuating doors, in particular of aircraft, are known and in standard use on the market in a variety of forms and designs.

Conventionally, aircraft doors are locked by means of mechanical manual locking mechanisms and are often opened manually or, where appropriate, hydraulically.

Hydraulic drive devices of aircraft doors, which automatically open the aircraft doors in an emergency actuation, are also known.

However, manually operable aircraft doors are often locked and swung open, if necessary, via elaborate gearing mechanisms.

U.S. Pat. No. 4,665,650 describes a device for actuating garden gates in which the garden gate is lifted out of a locking mechanism by means of a drive unit which is integrated in the gate post, and, during the lifting out process, the gate experiences a pivoting movement in order to open the garden gate.

U.S. Pat. No. 6,168,114 B1 discloses a door system for a passenger aircraft having a supporting device which supports the door leaf on the door frame in a pivotable fashion, and a lifting device which is connected to said supporting device.

DE 839 171 C discloses a device for electrically driving a component which can moved to and fro, in particular for opening and closing doors.

DE 31 21 136 A1 describes a pivoting gate whose drive is accommodated within a rotary bearing post. The latter is composed of a transmission device and a drive motor. Corresponding cam slots, which bring about travel and at the same time rotate the pivoting gate, are provided in a control tube.

An electric motor is used whose rotary movement is transmitted to a moveable component via a gear mechanism by means of a disengageable clutch which is connected downstream of said gear mechanism.

It is disadvantageous that devices of this type are, on the whole, elaborate and expensive, difficult to operate and also heavy. These devices are expensive to produce, cannot be remotely activated or remote-controlled, and usually require considerable manual force and time to operate, in particular when opening and/or closing doors of vehicles, in particular aircraft doors.

The object of the present invention is to create a use of the aforementioned type which eliminates the aforementioned disadvantages, and with which doors of vehicles, in particular aircraft, can be locked or opened by remote control in a precise, low-cost and effective manner.

SUMMARY OF THE INVENTION

To achieve the foregoing object, a stroke movement of a shaft element and subsequent rotation of a carrier element are performed by means of a drive element in an actuation device, the shaft element being axially and rotationally decoupled from the carrier element, the actuation device having a housing, and an actuator element with a shaft element connected to its front surface being inserted within the housing. In the present invention, it has proved particularly advantageous to drive an actuation device by means of only one single motor gearing unit, in order to implement first a stroke of a shaft element and then a rotation of a carrier element.

A stroke of a shaft element, which unlocks and lifts a door, is initially performed through axial movement of an actuator element within a housing of the actuation device.

On completion of the stroke of the extended shaft element, a coupling of the rotation with a carrier element is performed via at least one coupling element through a corresponding further rotation of the actuator element, in such a way that, for example, an aircraft door can be swung open via the carrier element. In a corresponding reverse manner, the door, in particular the aircraft door, can be locked through corresponding reverse rotation of the actuator element and reverse movement of the carrier element and, following the locking operation, the aircraft door is returned into the door frame and is simultaneously or subsequently locked through a corresponding return stroke of the shaft element.

The actuator element can be moved axially and rotationally backwards and forwards into the different planes within the housing, in particular the cylinder element of the actuation device, via corresponding interlocking guide links and link elements. Consideration should also be given to providing the corresponding guide links, for example, in an inner wall of the cylinder element, whereby corresponding guide elements are then assigned to the actuator element and engage with corresponding guide links. The invention is not restricted to this feature.

The present inventive concept also includes the feature that either the actuator element or the housing of the actuation device can be actively driven by means of or via the motor gearing unit. The invention is not restricted to this feature. Both options are conceivable.

The present invention produces a device with which two functions or movements can be performed in a synchronized manner in temporal succession by means of only one single motor gearing unit. An aircraft door, for example, can be unlocked and lifted from a door frame and can then be swung open by the carrier element. The corresponding guide links guarantee that, when the carrier element moves, a return stroke is prevented or ensured. A reverse closing swing of the aircraft door and subsequent insertion and locking of the door can similarly be synchronized with only one single motor gearing unit. By means of the corresponding guide links, these movement operations can be implemented in a very exact and precise manner by means of only one readily controllable and adjustable device with only one single motor gearing unit.

BRIEF DESCRIPTION OF THE DRAWINGS

Further advantages, features and details of the invention are described in the following description of preferred embodiments, and with reference to the drawing, in which:

FIG. 2 schematically shows a partial longitudinal section through the actuation device of the device according to FIG. 1 in a position of use;

FIG. 3 schematically shows a partial longitudinal section through the actuation device according to FIG. 1 in a further position of use.

DETAILED DESCRIPTION

Figure 1:
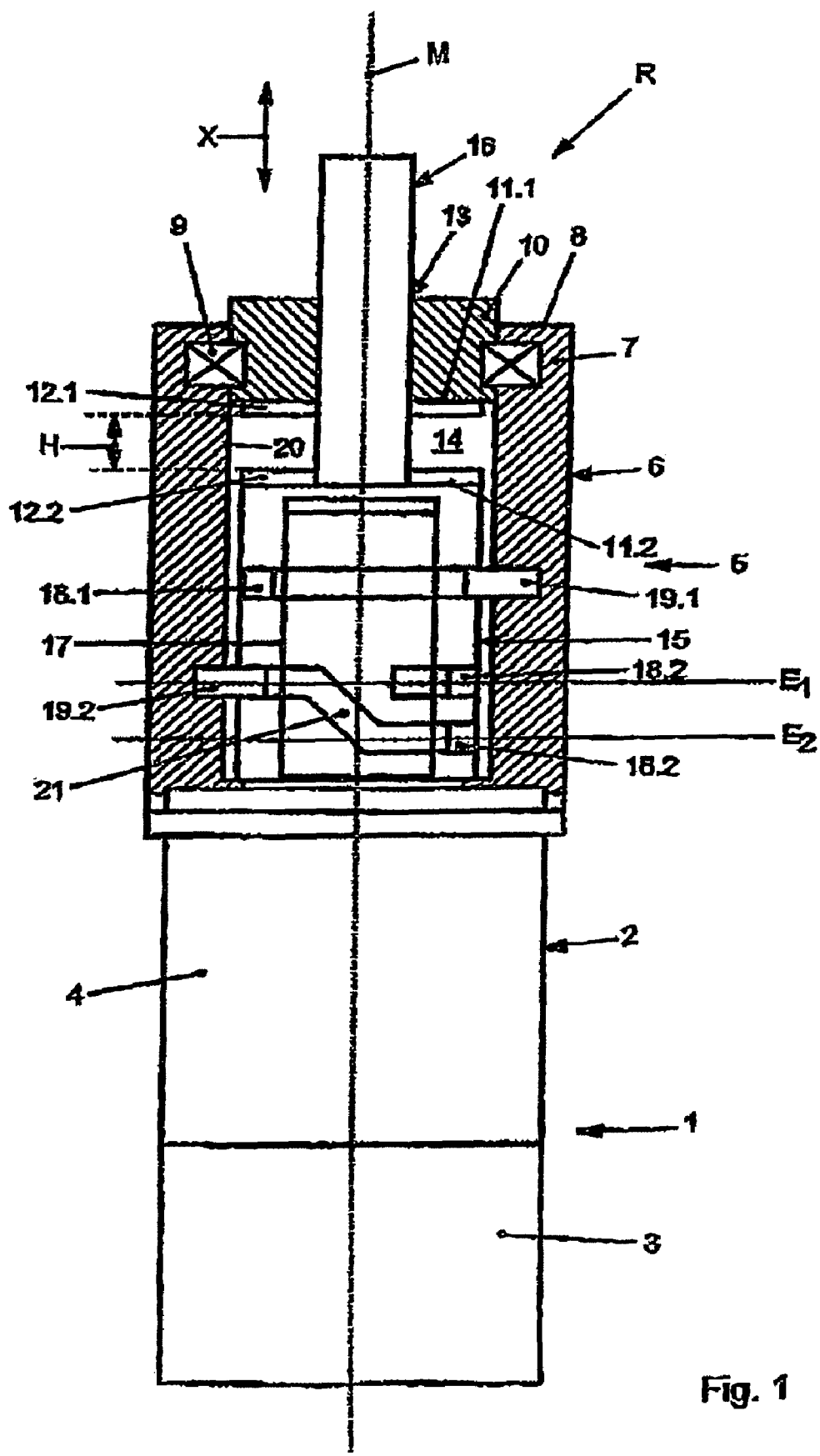
FIG. 1 schematically shows a horizontal projection with a partially cut away longitudinal section through a device for actuating doors, in particular aircraft doors.

According to FIG. 1, a device R according to the invention for actuating doors of vehicles, in particular aircraft, has a drive element 1 which is designed in the preferred embodiment as a motor gearing unit 2. A gearing unit 4 is connected to a motor 3. The gearing unit 4 or motor gearing unit 2 is connected to an actuation device 5. In the preferred embodiment, the actuation device 5 has a housing 6 which is preferably designed as a cylinder element 7 with rotational symmetry around a central axis M.

In the area of a front surface 8 of the cylinder element 7, a carrier element 10 is rotatably mounted around the central axis M via at least one bearing 9. The front surface of the carrier element 10 projects slightly beyond the front surface 8 of the cylinder element 7.

A coupling element 12.1, preferably designed as a toothed coupling, is provided on an inner front surface 11.1 of the carrier element. The carrier element 10 and the coupling element 12.1 are preferably designed in an annular form and are provided with a central bore 13.

An actuator element 15 is located with rotational symmetry around the central axis M in the inner space 14 of the housing 6 or the cylinder element 7. The shaft element 16, with rotational symmetry around the axis M, is connected to a front surface 11.2 of the actuator element 15, whereby a further coupling element 12.2, preferably designed as a toothed coupling, is assigned in an annular form to the front surface 11.2.

The shaft element 16 is mounted so that it can slide backwards and forwards axially in the direction X indicated by the double arrows along the central axis M within the bore 13 of the carrier element 10.

The carrier element 10 can be simultaneously moved or slid radially in relation to the shaft element 16.

Guide links 18.1, 18.2 are provided in an outer casing surface 17 of the actuator element 15, whereby the respective guide links 18.1, 18.2 are designed to revolve at least partially around the casing surface 17, interconnecting different planes E1, E2.

A link element 19.1, 19.2 is assigned to an inner wall 20 of the housing 6.

The link element 19.1 engages with the guide link 18.1 of the actuator element 15 and the link element 19.2 engages precisely with the guide link 18.2 of the actuator element 15.

The guide links 18.1, 18.2 are at least partially molded into the casing surface 17 of the actuator element 15 so that they can rotate through virtually 3600, whereby said links interconnect the respective planes E1, E2 of the guide links 18.1 or 18.2 via a pitch 21.

An axial guide 22, which equalizes a stroke H of the actuator element 15 between the carrier element 10 or its coupling elements 12.1, 12.2, is located between the motor gearing unit 2, in particular between the gearing unit 4 and the actuator element 15, as shown in particular in FIG. 2. This may, for example, be a splined shaft connection.

The mode of operation of the present invention is as follows:

In the embodiment of the present invention according to FIG. 1, a device R is described in which the actuator element 15 can be rotationally driven with the shaft element 16 connected to its front surface by means of the motor gearing unit 2.

In the present embodiment, the motor gearing unit 2 is preferably mounted in a torsion-resistant manner, so that with rotational, active driving of the actuator element 15 around the central axis M through the guide links 18.1, 18.2 described above, which engage with the guide elements 19.1, 19.2, the actuator element 15, as shown in particular in FIG. 3, can be moved in the X direction shown against the carrier element 10. The shaft element 16 is moved by the carrier element 10 through a stroke H.

If the front surfaces 11.1, 11.2 meet with one another when the actuator element 15 moves against the carrier element 10 and if the coupling elements 12.1, 12.2 lie adjacently, coupled with one another, as shown in particular in FIG. 2, a radial connection is established between the actuator element 15 and the carrier element 10 in a frictionally or positively engaging manner.

The scope of the invention is also intended to include the feature that the coupling elements 12.1, 12.2 transmit a radial rotation of the actuator element 15 onto the carrier plate 10 in a frictionally or positively engaging manner.

In particular as shown in FIG. 2, on completion of the stroke H of the actuator element 15, a subsequent rotation of the carrier element 10 can be synchronized.

An important feature of the present invention is that two functions of the actuator element 15 or the carrier element 10 can be performed in a synchronized manner by means of only one single motor gearing unit 2. The stroke of the shaft element 16 is first performed, until the actuator element 15 meets with the carrier element 10, in order to then cause the latter, once the stroke is completed, to rotate in accordance with the guide links 18.1, 18.2.

In a corresponding reverse sequence, the carrier element 10 can first be moved back by changing the drive direction of the motor gearing unit 2, and the actuator element 15 with the shaft element 16, as shown from FIG. 1 to FIG. 3, can then be moved back through a stroke H, in that the actuator element 15 moves from the plane $E_1$ into the plane $E_2$ along the guide links 18.1, 18.2. The rotation of the carrier plate 10 is first performed, followed by a return stroke of the shaft element 16 into an original starting position, as shown in FIG. 1.

The scope of the present invention is further intended to include the feature that, for example, the motor gearing unit 2 does not rotationally drive the actuator element 5, but rather the housing 6, in particular its cylinder element 7. In this case, the shaft element 16 is fixed to any door in a torsion-resistant manner in relation to the central axis M.

By rotating the housing 6, the actuator element 15 can be moved according to the direction of rotation to produce the stroke H in the X direction shown in FIG. 3, until the couplings 12.1, 12.2 frictionally or positively engage and the carrier element 10 is then rotated around the central axis M. This similarly falls within the scope of the present invention.

Particularly in the case of aircraft doors not shown here, such doors can be unlocked and lifted at very low cost by means of only one single motor gearing unit 2 through a stroke H of the shaft element 16. Once the aircraft door has been unlocked and lifted, the carrier element 10 is rotated around the central axis M through corresponding further radial rotation of the actuator element 15 in order to swing open the aircraft door. The door is closed through a change in direction of the motor gearing unit 2, whereby the door is lowered or inserted and locked by the subsequent return stroke of the shaft element 16.

The invention claimed is:

1. A device for actuating doors of a vehicle comprising:
   an actuator element mounted within an actuation device for relative rotational movement with the actuator element about an axis M and reciprocal linear movement in a direction X wherein the direction X is parallel to the rotational axis M;
   a shaft element extending along axis M and having a first end connected to a door and a second end connected to a front surface of the actuator element;
   a drive means for sequentially driving one of (1) the actuator and (2) actuation device about axis M and thereafter in direction X through a stroke distance H between a first position and a second position;

the actuation device comprises a cylinder element having rotational symmetry around axis M and having a front surface in which a carrier element is rotatably mounted about axis M;

the carrier element has a coupling on a surface thereof which engages with a coupling on the front surface of the actuator element when the actuator element is in the first position;

and link means for linking an outer surface of the actuator element to an inner surface of the actuation device.

2. The device as claimed in claim 1, wherein the drive means comprises an electrically operated and controllable motor gearing unit.

3. The device as claimed in claim 2, wherein the actuation device is connected to the motor gearing unit.

4. The device as claimed in claim 2, wherein the cylinder element is driven rotationally around the central axis M via the motor gearing unit.

5. The device as claimed in claim 4, wherein, through rotational driving of the cylinder element, the actuator element is moved through the stroke H, guided by the link means against the carrier element, until the coupling of the carrier element and the actuator element meet with one another and the carrier element is rotated through further radial rotation of one of the actuator element or the housing.

6. The device as claimed in claim 1, wherein the actuation device is connected to the drive means.

7. The device as claimed in claim 1, wherein the actuator element has a multiplicity of guide links in a casing surface.

8. The device as claimed in claim 7, wherein at least one guide element which interworks with the multiplicity of guide links of the actuator element, is inserted into the cylinder element.

9. The device as claimed in claim 7, wherein the multiplicity of guide links interconnect different planes in the casing surface.

10. The device as claimed in claim 1, wherein the carrier element is mounted to rotate around central axis (M) and is assigned to the drive element.

11. The device as claimed in claim 1, wherein the coupling on the carrier element and on the actuator element are aligned radially in relation to one another.

12. The device as claimed in claim 1 wherein an axial guide is provided between the actuation device and the drive element.

* * * * *